H. J. HICK.
FILING APPLIANCE.
APPLICATION FILED APR. 15, 1911.
1,168,805.
Patented Jan. 18, 1916.
5 SHEETS—SHEET 5.
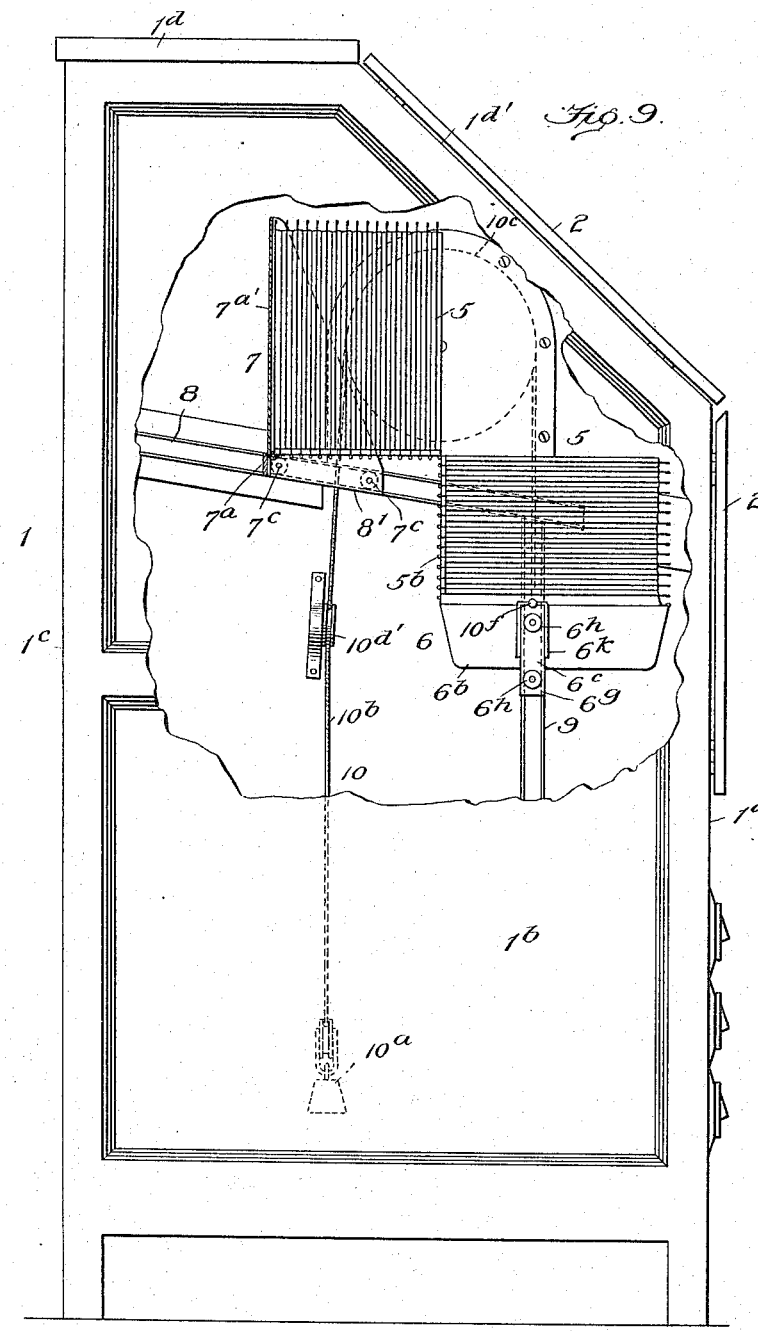

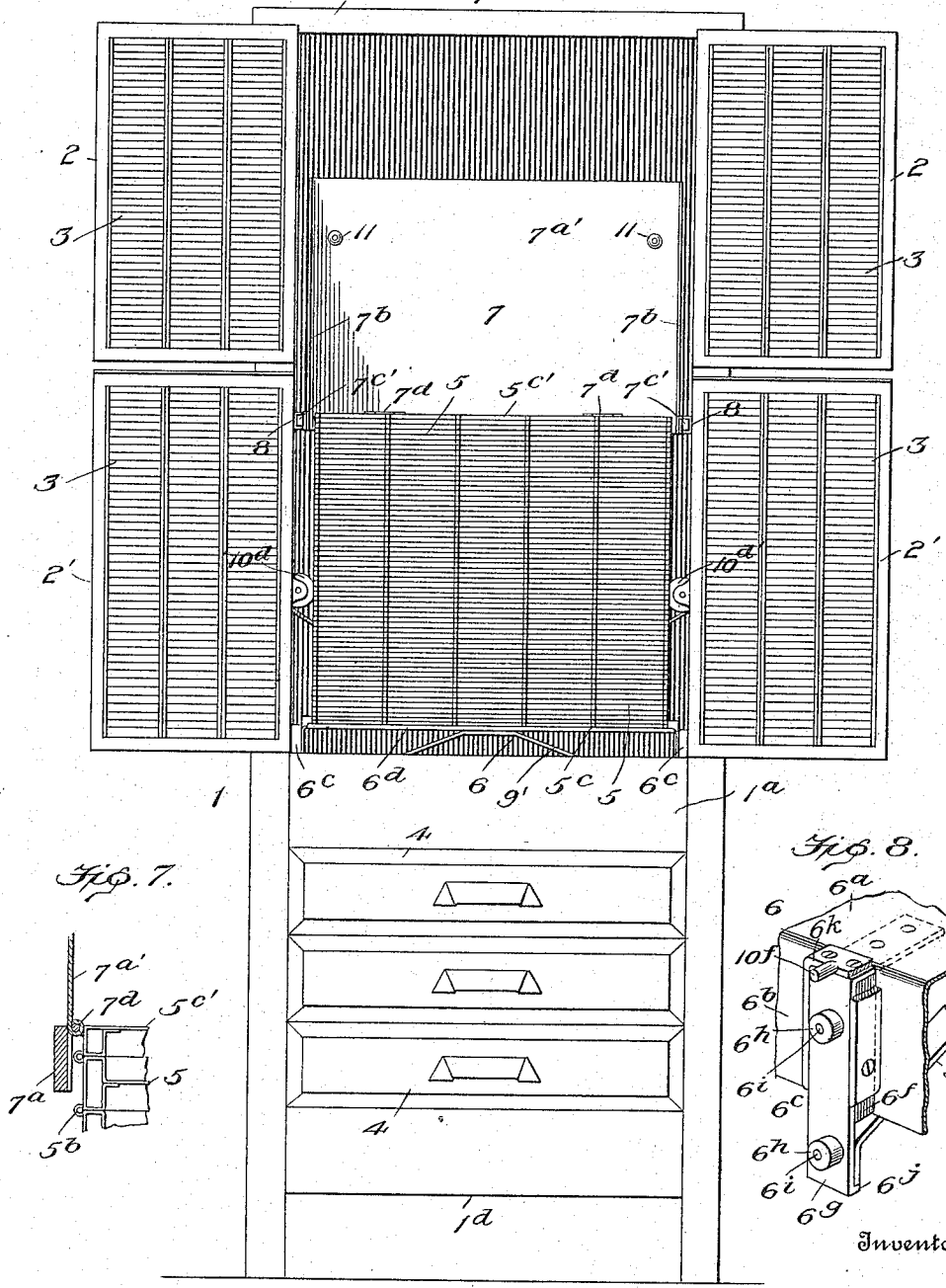

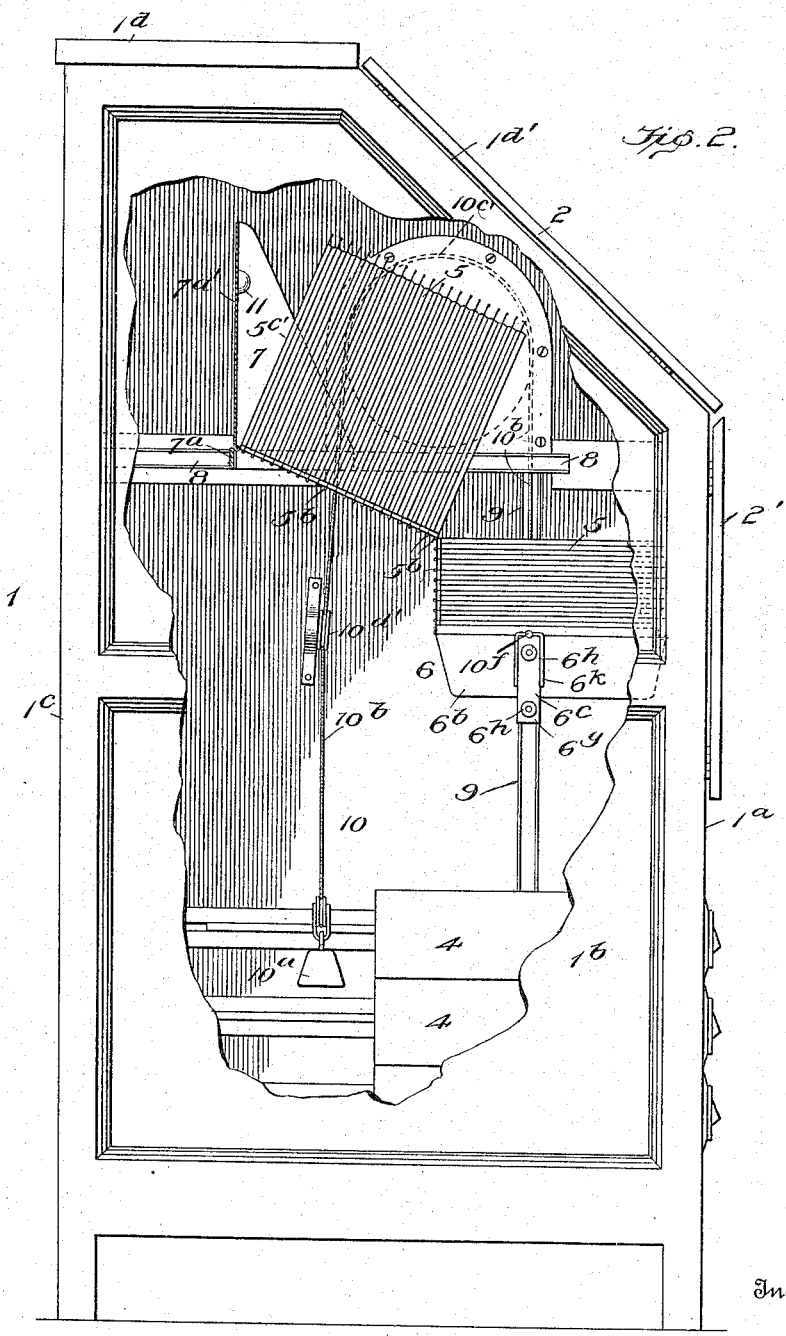

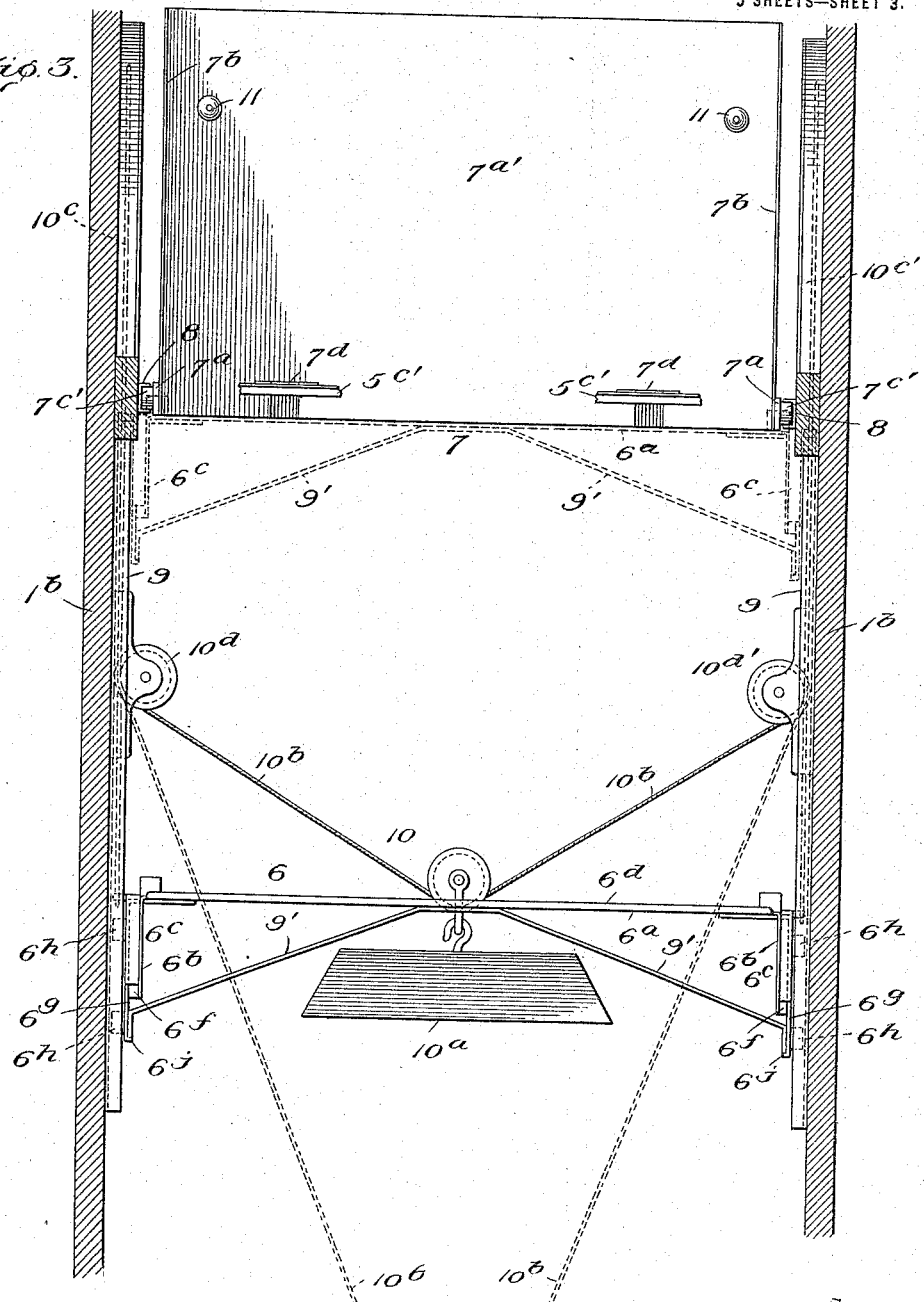

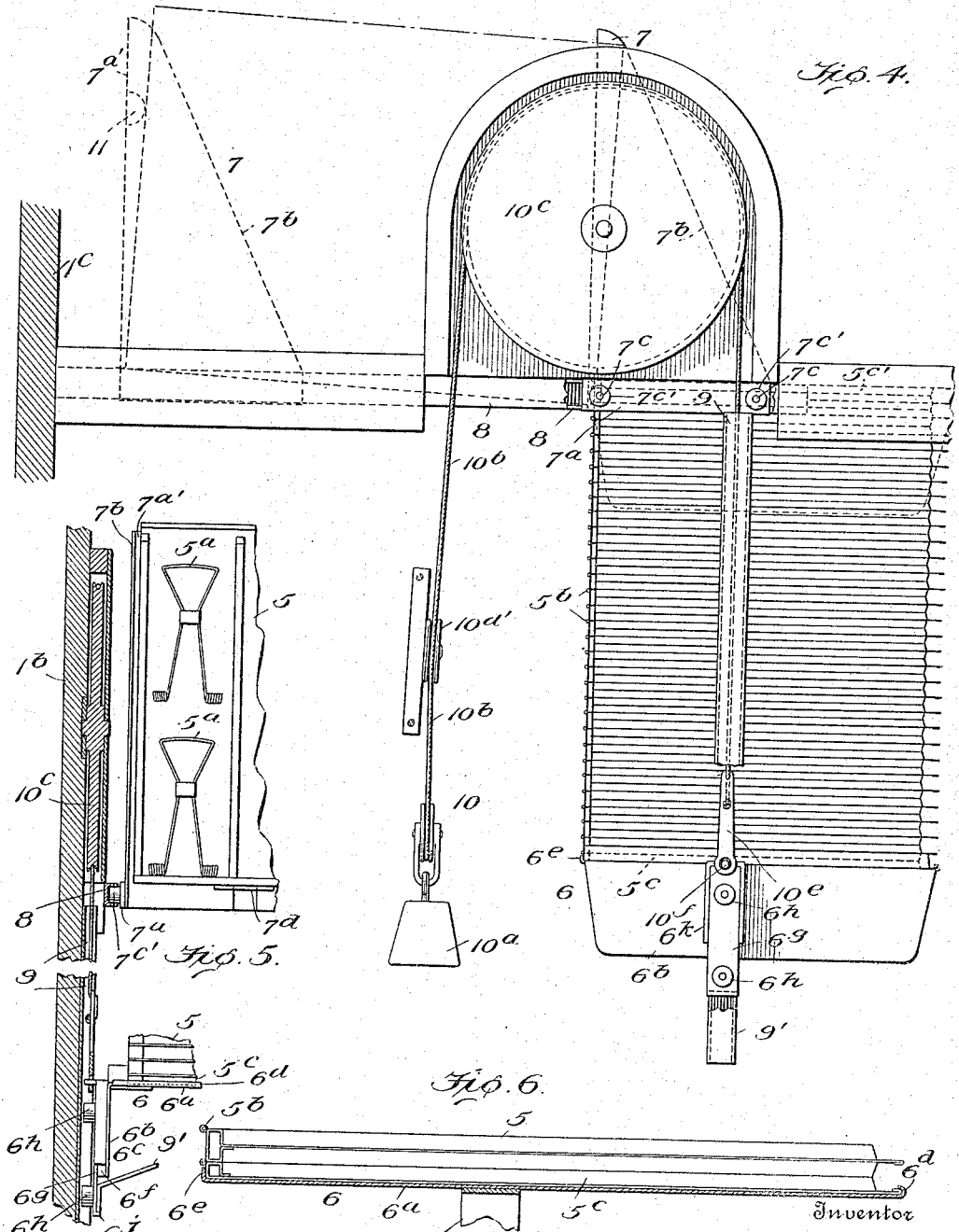

UNITED STATES PATENT OFFICE.

HARRY J. HICK, OF ALLIANCE, OHIO, ASSIGNOR, BY MESNE ASSIGNMENTS, TO THE McCASKEY REGISTER COMPANY, (INCORPORATED IN 1914,) OF ALLIANCE, OHIO, A CORPORATION OF OHIO.

FILING APPLIANCE.

1,168,805.  Specification of Letters Patent.  Patented Jan. 18, 1916.

Application filed April 15, 1911. Serial No. 621,392.

*To all whom it may concern:*

Be it known that I, HARRY J. HICK, a citizen of the United States, residing at Alliance, in the county of Stark and State of Ohio, have invented certain new and useful Improvements in and Relating to Filing Appliances, of which the following is a specification.

This invention relates to filing appliances adapted for detachably holding papers, account slips or bills and the like in systematic order and in a manner to permit their rapid filing and removal.

For the purpose of illustration I have, in the accompanying drawings, shown and herein described one form of filing appliance embodying my invention.

In the drawings—Figure 1 is a front view of an appliance embodying my invention, the doors of the casing being open. Fig. 2 is a side elevation of the appliance, the near side of the casing being broken away and a portion of the leaves shown in an operated position. Fig. 3 is a vertical sectional view through the casing, the leaves or frames being omitted and the supports therefor being shown in front elevation. Fig. 4 is a fragmentary side elevation of the leaves or frames and the supports therefor, all of the leaves or frames being shown in horizontal position. Fig. 5 is a fragmentary sectional view, certain parts being shown in elevation, illustrating details of construction. Figs. 6, 7, and 8 are fragmentary views also illustrating details of construction. Fig. 9 is a side elevation of an appliance illustrating a modification of the invention, the near side of the casing being broken away.

In the drawings 1 indicates a casing, which may be constructed in any usual or preferred form, for supporting and housing the mechanism hereinafter described. It is preferably provided with a front $1^a$, sides $1^b, 1^b$, a back $1^c$ and top and bottom $1^d$. The upper front portion of the casing is preferably inclined, as shown at $1^{a'}$, to facilitate the operation of the mechanism.

2, 2' indicate doors for the casing. These doors preferably support suitable indexes 3, on which the names and designating or indexing devices may be written or supported.

The casing 1 may be arranged to accommodate one or more drawers, such as indicated at 4.

5 indicates a series of frames or leaves, each of which supports on one or both faces slips, papers, or bills in any desired order or arrangement. Preferably, each leaf is provided with spring clips, such as indicated at $5^a$, behind which the slips, papers, or bills are filed, and alined contact or separation strips which keep each leaf spaced from the adjoining leaf.

$5^b$ indicates pivotal or gear connections between each leaf and the adjoining leaf or leaves. These connections permit the leaves to be swung from a vertical position to a horizontal position, and vice versa, singly or in groups.

6, 7, indicate two freely movable frames, to which the opposite end leaves (which may be designated by the numerals $5^c$ and $5^{c'}$) of the series of leaves are connected. These frames coöperate with each other to support the leaves at all times, and permit their operation from the vertical position to the horizontal position, and vice versa. One of said frames, for instance the frame 6, moves up or down or vertically to accommodate itself to the number of leaves superposed thereon; while the other frame 7 moves horizontally or back and forth to accommodate itself to the number of leaves which may be arranged in the vertical position from front to rear at any time. By mounting the end leaves of the series of leaves upon movable supports, it will be seen that the entire series can be shifted or moved relative to a common operative or working position opposite the front of the casing 1 to permit access to any particular leaf. Stationary support and guide devices for the frames 6 and 7 are arranged to one side thereof, in order to facilitate the operation of shifting the leaves from one position to another. Of these devices 8, 8 indicate a pair of horizontally extending bars, preferably channel bars, fixed to the opposite inner sides $1^b$ of the casing 1 and forming guides for the horizontally moving frame 7.

The horizontally movable frame or support 7 preferably comprises a U-shaped bar $7^a$, and a sheet metal plate $7^b$ of similar shape secured thereto to form a back $7^{a'}$ and side members. $7^c$ indicates sets of studs projecting laterally from the side members of the frame 7 and having sliding engagement with the walls of the guides 8, 8. These studs are spaced apart from each other and maintain the frame 7 in upright position against tilting in either direction. Each stud may be provided with an anti-friction roller $7^{c'}$ to reduce the friction between the guides and studs.

$7^d$ indicate one or more pivotal supports, mounted on the inner face of the back $7^{a'}$, to which the end leaf $5^{c'}$ is connected.

9, 9, indicate a pair of vertically extending alined bars, preferably of channel form, fixed to the opposite inner sides $1^b$ of the casing and forming guides for the frame or elevator 6.

The elevator 6 preferably comprises a platform or table $6^a$ having side plates $6^b$ and a pair of slide devices $6^c$ secured thereto, which move vertically in the guides 9 and prevent a tilting of the table in either direction. The platform $6^a$ is preferably provided with means to which the end leaf $5^c$ may be connected, and for that purpose its front edge is doubled over as shown at $6^d$. The lip $6^d$ forms a recess, with the adjacent face of the platform, to receive the free edge of the end leaf $5^c$.

$6^e$ indicates a flange provided along the rear edge of the platform $6^a$ and serving to engage the rear edge of the leaf $5^c$ and thus maintain its front edge beneath the lip $6^d$. By first raising the rear end of the said leaf, it can be readily disconnected from the platform.

Each of the slide devices $6^c$ may comprise a block $6^f$, which is secured to the adjacent side plate $6^b$, an angle bar $6^g$ and one or more guide engaging members, such as rollers $6^h$, loosely mounted on suitable pins or shafts $6^i$ carried by the adjacent angle bar $6^g$. One leg of the bar $6^g$ is secured to the adjacent block $6^f$, while its opposite leg extends through an aperture formed in the adjacent side plate $6^b$ and forms a base or support for the platform $6^a$. The platform $6^a$ may be secured to each angle bar by rivets or bolts. Each angle bar $6^g$ is preferably formed with a flange $6^j$ at its lower end to form a support for the adjacent end of a brace bar $9'$. This bar extends from one angle bar $6^g$ to the other and is inclined or curved upwardly throughout its central portion to engage with and form a support for the center of the platform $6^a$.

10 indicates counterbalancing means for the elevator 6 and normally operating to maintain it in a raised position—see dotted lines in Fig. 4. These means preferably comprise a weight $10^a$ suspended by a rope or chain $10^b$ which is connected to the elevator at one end, whereby the weight is raised and lowered by the movement thereof. As shown in the drawings, the rope $10^b$ may be connected at its opposite ends to opposite sides of the elevator 6 and carried over pulleys $10^c$, $10^d$, and $10^{c'}$, $10^{d'}$, suitably mounted in bearings on opposite sides of the casing, that portion of the rope or chain extending between the pulleys $10^d$ and $10^{d'}$ forming a suspension loop for the weight $10^a$. As the elevator rises and falls the loop is made longer or shorter and thus imparts vertical movement to the weight. The weight $10^a$ may be provided with a pulley around which the rope $10^b$ passes. The rope $10^b$ is preferably provided with links $10^e$ at its opposite ends. Each of these links is formed with an opening at or near its free end fitting over a pin $10^f$ which projects laterally from a plate $6^k$ screwed or bolted to the adjacent slide $6^c$. This plate may be U-shaped and inverted on the slide so as to engage with the opposite faces of the slide block $6^f$.

11 indicates a buffer or cushion carried by the frame 7. It operates to engage and cushion the end leaf $5^{c'}$ when it or succeeding leaves are moved into the vertical position.

By my invention a very large number of leaves can be operatively connected together into a single series, thus conveniently accommodating a very large number of accounts in a comparatively small space. This advantage is accomplished by slidingly mounting the leaves as a series, whereby they may be bodily shifted from one position to another. Such operation permits the leaves to be easily and quickly moved back and forth past that position of accessibility most convenient for the operator, so that each may be brought or moved into that position for access to any particular leaf or space thereon.

In carrying out the objects of the invention, the opposite end leaves of the series are supported by or suspended between two supports, movable at substantially right angles to each other, and the intermediate leaves are pivotally connected to said end leaves and to each other along their lower edges. The leaves may be arranged normally in either a vertical position or a horizontal position. They are swingable from one of said positions to the other singly or in groups. When a leaf is swung from the vertical to the horizontal position, all those leaves remaining in the vertical position and the frame 7 move forward toward the operator, the frontmost leaf always taking a given position substantially a predetermined distance from the eye of the operator and the counterbalanced frame 6 and those leaves which may be supported thereon, move downwardly to accommodate the leaves which must be assembled in a vertical pack with the uppermost ones supported in a horizontal plane substantially in line with the lower edges of the remaining vertical leaves and freely exposed on its top surface to the eye of the operator. Inversely, when a leaf is swung from the horizontal to the vertical position, the frame or elevator 7 moves upwardly and the frame 6 moves rearwardly.

As is clear from the drawings, the front face of the foremost vertical leaf and the upper face of the uppermost horizontal leaf at any time are opposite what may be termed the "leaf-accessible" position, which is arranged at a convenient height for the operator or operators. By shifting the series of leaves from one position to another, each leaf can be brought opposite such "leaf-accessible" position, to permit the inspection of the papers, bills or slips thereon, their removal, etc.

It is not essential that the leaves or frames be operated separately, or that they be moved vertically or horizontally, as the case may be, into the "leaf-accessible" position and then swung to the other position, in order to bring a particular leaf or frame into position for access. The series of leaves or frames being supported or suspended at its opposite ends between two movable, coöperating supports, the leaves thereof may be operated in groups of two or more at a time to economize time and labor, the hinge or gear connections between adjoining leaves permitting any number of leaves to be swung as a group relative to adjoining leaves, no matter in what position the leaves or a portion of them may stand. This operation will be clearly understood from Fig. 2. Furthermore, as the space below those leaves which may be in the vertical position and behind those leaves which may be in the horizontal position, is entirely open, the turning or swinging movement of a group of leaves from one position to another may take place synchronously with the vertical and horizontal movements of the frames 6 and 7, respectively. As a result of these combined movements, any number of leaves or frames can be operated and the leaves as a series shifted to a different position in a rapid and positive manner, no matter how remote any particular leaf may be from the "leaf-accessible" position.

Referring to Fig. 9, wherein I have illustrated a slightly modified form of the invention, it will be seen that the bars 8 are slightly inclined upwardly from front to rear and that the lower edge of the horizontally movable frame is inclined, as shown at 8', in order that the front studs 7ᶜ may be arranged slightly below the rear studs and thus coöperate with the inclined bars 8 to support the frame or support 7 in a substantially vertical position. In this form of construction, the weight of the rear end of those leaves in the vertical position is upon the horizontally arranged leaves and thus tends to prevent the vertically arranged leaves from falling forward.

What I claim is:

1. In a filing appliance, stationary supporting means including uprightly and horizontally disposed guide-ways, a horizontal table frame movable upward and downward and an upright back frame movable to and fro in the respective guide-ways and being held against tilting thereby, a series of leaves hinged together at their lower-rear edges, the upper-rearmost leaf being connected with the back frame and the lower-foremost leaf being connected with the table frame, whereby the series of frames is carried by the back and table frames free from contact with the stationary supporting means, and can be bodily swung singly or collectively from a face to face upright position against the back frame to a face to face reclined position upon the table frame, and vice versa.

2. In a filing appliance, stationary supporting means including uprightly and horizontally disposed guide-ways, a horizontal table frame movable upward and downward and an upright back frame movable to and fro in the respective guide-ways and being held against tilting thereby, a series of leaves hinged together at their lower-rear edges, the upper-rearmost leaf being connected with the back frame and the lower-foremost leaf being connected with the table frame, whereby the series of frames is carried by the back and table frames free from contact with the stationary supporting means, and can be bodily swung singly or collectively from a face to face upright position against the back frame to a face to face reclined position upon the table frame, and vice versa, and means for counter-balancing the table frame and the weight of the leaves superposed thereon.

In testimony whereof I affix my signature, in the presence of two witnesses.

HARRY J. HICK.

Witnesses:
  GEO. C. RUSSELL,
  HENRY F. POLLOCK.

Copies of this patent may be obtained for five cents each, by addressing the "Commissioner of Patents, Washington, D. C."